United States Patent
Madgwick et al.

(10) Patent No.: US 11,720,242 B2
(45) Date of Patent: *Aug. 8, 2023

(54) COMPUTER METHOD, SYSTEM AND PRODUCT FOR PLAYLIST CONTROL USING MEDIA SPOTS HAVING INTELLIGENT CONTENT

(71) Applicant: JOHN RYAN INC., Excelsior, MN (US)

(72) Inventors: Gary Paul Madgwick, Lightwater (GB); Nancy Radermecher, Woodland, MN (US)

(73) Assignee: John Ryan, Inc., Excelsior, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/677,307

(22) Filed: Feb. 22, 2022

(65) Prior Publication Data

US 2022/0179548 A1  Jun. 9, 2022

Related U.S. Application Data

(63) Continuation of application No. 16/283,596, filed on Feb. 22, 2019, now Pat. No. 11,287,958, which is a
(Continued)

(51) Int. Cl.
*G06F 3/04845* (2022.01)
*G06F 3/0482* (2013.01)
(Continued)

(52) U.S. Cl.
CPC ........ *G06F 3/04845* (2013.01); *G06F 3/0482* (2013.01); *G06F 16/4387* (2019.01);
(Continued)

(58) Field of Classification Search
CPC .............. G06F 3/04845; G06F 3/0482; G06F 16/4387; G06F 40/186; G06Q 30/0259; G06Q 30/0251; H04L 63/105; H04L 67/10
See application file for complete search history.

(56) References Cited

U.S. PATENT DOCUMENTS

| 10,216,384 B2 | 2/2019 | Madgwick et al. |
| 2003/0149975 A1 | 8/2003 | Eldering et al. |

(Continued)

*Primary Examiner* — Yuk Ting Choi
(74) *Attorney, Agent, or Firm* — Dorsey & Whitney LLP

(57) ABSTRACT

A digital signage system provides a processor and memory; a media player for delivering content to digital signage that stores at least one playlist having media slots for playing media spots, where at least one of the media spots is a content controlling spot that includes intelligent content including attributes and attribute values for commanding control of delivery of other media spots, where the content controlling spot is configured to, upon being instigated, use the intelligent content to search for media spots to be played by the media player, identify a plurality of published media spots to be played based on a set of attributes and attribute values associated therewith, and cause one of the plurality of the published media spots to be retrieved based on the set of attributes and attribute values associated with the spot, and where the media player plays the retrieved spot on the digital signage.

20 Claims, 10 Drawing Sheets

Related U.S. Application Data continuation of application No. 14/796,492, filed on Jul. 10, 2015, now Pat. No. 10,216,384, which is a continuation-in-part of application No. 14/640,103, filed on Mar. 6, 2015, now abandoned.

(60) Provisional application No. 61/949,768, filed on Mar. 7, 2014.

(51) Int. Cl.
*G06F 16/438* (2019.01)
*G06F 40/186* (2020.01)
*H04L 67/10* (2022.01)
*H04L 9/40* (2022.01)
*G06Q 30/0251* (2023.01)

(52) U.S. Cl.
CPC ....... *G06F 40/186* (2020.01); *G06Q 30/0259* (2013.01); *H04L 63/105* (2013.01); *H04L 67/10* (2013.01); *G06Q 30/0251* (2013.01)

(56) References Cited

U.S. PATENT DOCUMENTS

| | | |
|---|---|---|
| 2007/0055389 A1 | 3/2007 | Harwood |
| 2007/0282898 A1* | 12/2007 | Stark ................ H04N 21/26258 707/999.103 |
| 2008/0147728 A1 | 6/2008 | Reichert |
| 2008/0307454 A1* | 12/2008 | Ahanger .............. H04N 21/854 725/36 |
| 2009/0106082 A1* | 4/2009 | Senti ...................... G06Q 30/02 705/14.69 |
| 2009/0144157 A1* | 6/2009 | Saracino ................ G06Q 30/02 726/4 |
| 2010/0088716 A1 | 4/2010 | Ellanti et al. |
| 2011/0246661 A1 | 10/2011 | Manzari et al. |
| 2012/0179968 A1* | 7/2012 | Madnick ................ G06Q 30/02 715/777 |
| 2014/0013354 A1* | 1/2014 | Johnson ................ G06Q 30/02 725/35 |
| 2015/0254354 A1 | 9/2015 | Madgwick et al. |
| 2015/0370461 A1* | 12/2015 | Zhang ..................... G06F 9/451 715/716 |
| 2019/0187884 A1 | 6/2019 | Madgwick et al. |

\* cited by examiner

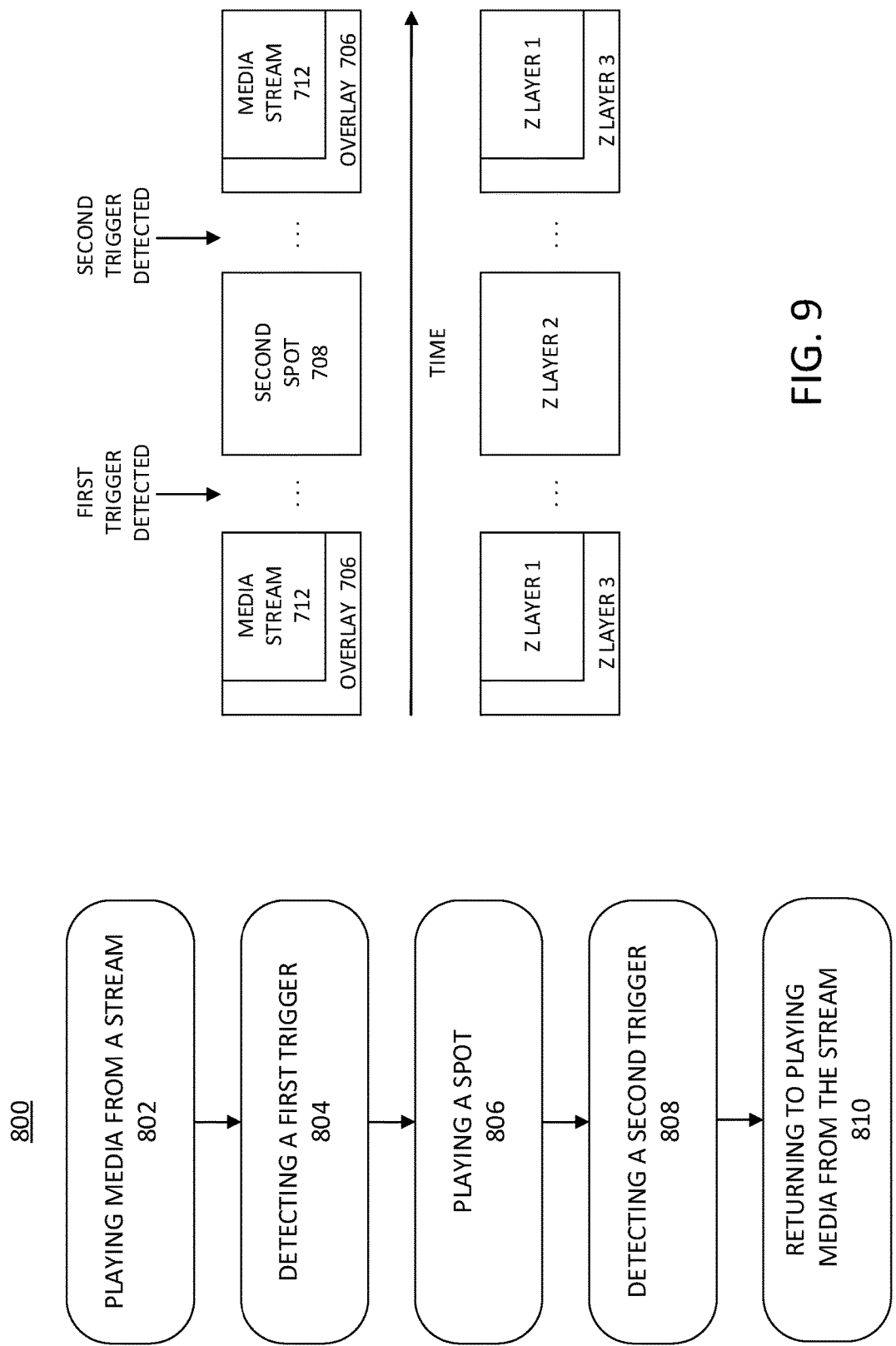

COMPUTER METHOD, SYSTEM AND PRODUCT FOR PLAYLIST CONTROL USING MEDIA SPOTS HAVING INTELLIGENT CONTENT

CROSS-REFERENCE TO RELATED APPLICATIONS

This application is a continuation of U.S. application Ser. No. 16/283,596, filed Feb. 22, 2019, now U.S. Pat. No. 11,297,958, which is a continuation of U.S. application Ser. No. 14/796,492, filed Jul. 10, 2015, now U.S. Pat. No. 10,216,384, which is a continuation-in-part of U.S. application Ser. No. 14/640,103 filed Mar. 6, 2015, which claims benefit of priority from U.S. Provisional Application No. 61/949,768, the contents of each are herein incorporated by reference.

FIELD OF THE DISCLOSURE

Implementations are directed to digital signage networks adapted to play media spots. More particularly, systems and methods for creating the media spots according to templates and rules.

BACKGROUND

Conventional digital signage networks typically distribute media content within a playlist for playing on screens within a number of entities within the network. Typically, multiple copies of the same playlist are distributed across each of the network entities. Implementing changes to these playlists often requires time-consuming, manual edits of each playlist distributed. As a result, to avoid this requirement, many playlists transmit generalized content or outdated content.

SUMMARY

Certain implementations may include a computer-implemented method, system and/or computer program product that uses an existing system's playlist and playback to embed a content controlling spot. One or more electronic databases store a playlist with a content controlling spot therein. The content controlling spot is a spot adapted to execute instructions for retrieving media files stored remotely or locally for its use. The content controlling spot then controls the playback of the media. After it has finished, the content controlling spot hands back control to the host system and the host system's playlist continues.

Certain implementations may include a method for generating a spot for display on digital signage having a plurality of playback slots. The method may comprise providing a framework of the spot to a first user. The framework may comprise a plurality of content zones, and a rule set comprising an editable feature rule and a scheduling rule. The method may further comprise receiving an edit set from the first user. The edit set may comprise one or more edits to one or more content zones. The method may further comprise updating the spot based on the edit set without violating the editable feature rule; and receiving a scheduling set from the first user. The scheduling set may comprise one or more schedules for the playback of the content spot. The method may further comprise linking the spot to a playback slot of the plurality of playback slots of digital signage based on the scheduling set without violating the scheduling rule; and publishing the spot for playback at the digital signage according to the playback slot.

Certain implementations may include a method for publishing a spot for display on digital signage at a target location and a target time according to a rule set, the spot having a plurality of layers. The method may comprise providing a user interface to a plurality of users, each user having a permissions level. The method may also comprise updating at least one layer of the plurality of layers based on input received from at least one layer user of the plurality of users over the user interface responsive to determining that, based on the layer user's permissions level, updating the at least one layer by the layer user does not violate the rule set. The method may further comprise updating the target location based on input received from at least one location user over the user interface responsive to determining that, based on the location user's permissions level, updating the at least one layer by the location user does not violate the rule set. The method may further comprise updating the target time based on input received from at least one time user over the user interface responsive to determining that, based on the time user's permissions level, updating the at least one layer by the time user does not violate the rule set. The method may further comprise merging the layers; and publishing the spot on the digital signage at the target location and the target time.

Certain implementations of the aforementioned methods may be implemented as computer executable instructions stored on a non-transitory, computer readable medium. When executed, the instructions may cause a processor to perform one or more steps of the method.

Certain implementations may include a device comprising a processor, a media, and an interface. The media may comprise computer executable instructions that when executed cause the processor to provide a framework of a spot to a user, the framework comprising: a plurality of content zones and a rule set comprising an editable feature rule and a scheduling rule. The media may further comprise instructions that when executed cause the processor to update the spot based on an edit set without violating the editable feature rule responsive to receiving an edit set from the user, the edit set comprising an edit to a content zone. The media may further comprise instructions that when executed cause the processor to link the spot to a playback slot of digital signage based on a scheduling set without violating the scheduling rule, responsive to receiving the scheduling set from the user, the scheduling set comprising one or more schedules for the playback of the content spot; and play the spot at the digital signage according to the playback slot.

Certain implementations of a digital signage system may comprise a media player, a media spot generator portal, a content zone editor portal, a scheduler portal, and a publisher. The media player may comprise a processor and memory for delivering content to digital signage, the media player storing at least one playlist having media slots for playing media spots. At least one of the media spots may be a content controlling spot that includes intelligent content for commanding control of delivery of other media spots. The media spot generator portal may permit a user having a first permission level to build an editable media spot having a framework, permission-based edit rules, and attributes, the framework comprising a plurality of content zones, the content zones editable based on the edit rules and having default content. The content zone editor portal may permit a user having a second permission level, different from the first permission level, to edit one or more of the content zones in the framework. The scheduler portal may associate a playback schedule with the editable media spot. The publisher may publish the editable media spot having the associated playback schedule and attributes. The content controlling spot may be configured to, upon being instigated, cause the published media spot to be retrieved based on the set of attributes associated with the published media spot, and wherein the media player plays the published media spot on the digital signage.

The published media spot may be stored remotely from the content controlling spot. The content zone editor portal may comprise a reference map showing one or more of the content zones that the user having the second permission level has permission to edit. The framework may comprise one or more of the following: styles, content, and effects. The framework may comprise a template uploaded by the user having the first permission level. The attributes may comprise characteristics assigned to slots and spots. The characteristics may be selected from a group consisting of secondary language spoken, regional affiliation, state, primary segment served or neighborhood type. The content controlling spot may be configured to, upon being instigated, cause the published media spot to be retrieved based on the set of attributes associated with the published media spot and an attribute-based query or rule. The media spot generator portal may further permit the user having the first permission level to modify which of the one or more of the content zones the user having the second permission level is allowed to edit. The published media spot may be configured to use the reference to the set of attributes to fill in gaps in content in the published media spot when the published media spot is retrieved. The default content may be configured to be displayed if the default content is not edited by the user having a second permission level.

Implementations of a digital signage system include a processor and memory; a media player for delivering content to digital signage, which stores at least one playlist having media slots for playing media spots, where at least one of the media spots is a content controlling spot that includes intelligent content for commanding control of delivery of other media spots, the intelligent content including attributes and attribute values, where the content controlling spot is configured to, upon being instigated, use the intelligent content to search for media spots to be played by the media player, identify a plurality of published media spots to be played based on a set of attributes and attribute values associated therewith, and cause one of the plurality of the published media spots to be retrieved based on the set of attributes and attribute values associated with the published media spot, and where the media player plays the retrieved published media spot on the digital signage.

BRIEF DESCRIPTION OF THE DRAWINGS

FIG. 8 illustrates a method for playing both media stream content and spots on digital signage, according to certain implementations.

FIG. 9 illustrates a representation of the method shown and described in FIG. 8.

DETAILED DESCRIPTION

Overview

Figure 1A:
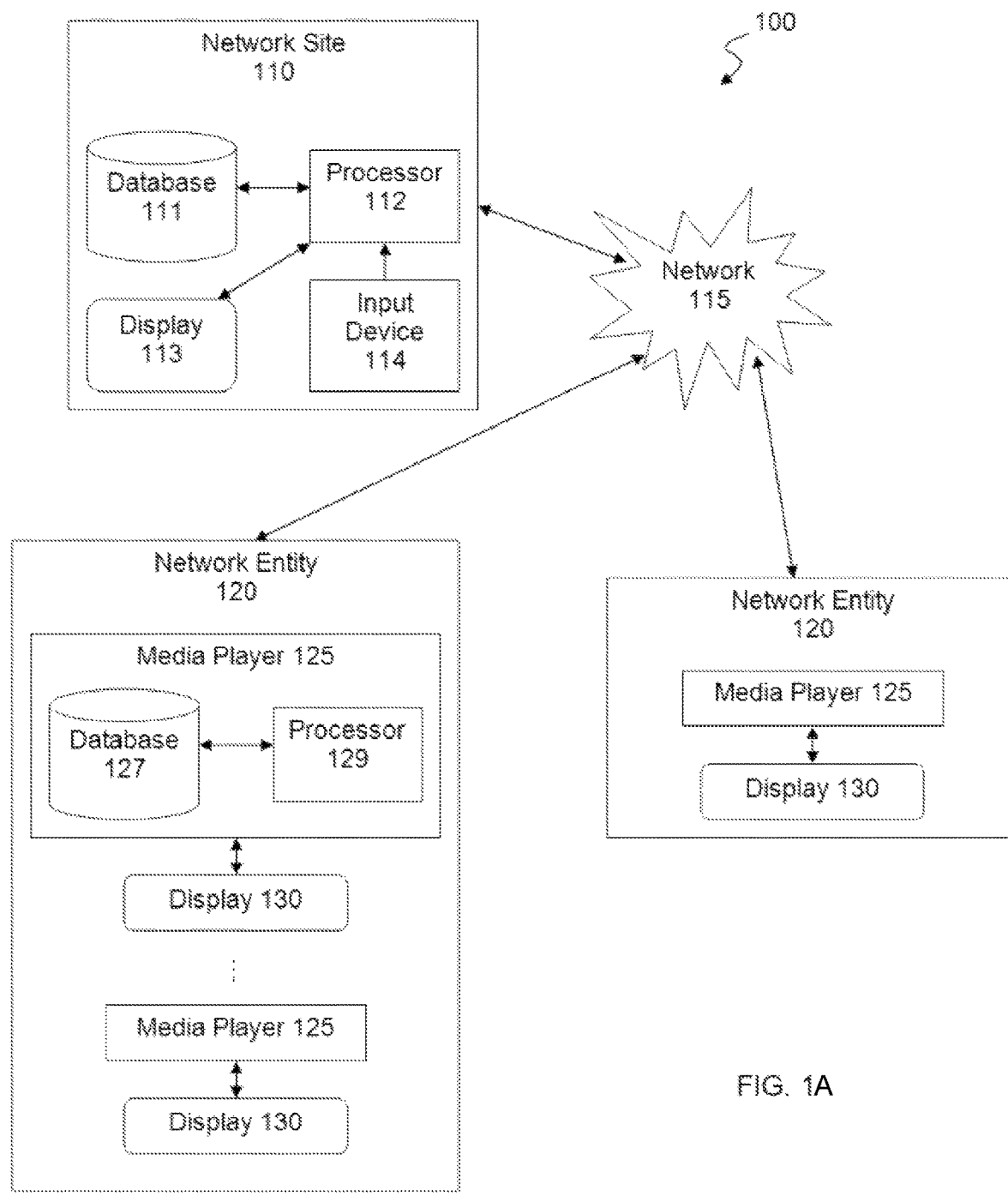
FIG. 1A is a block diagram of a digital signage network according to certain implementations.

Implementations provide systems, methods and computer program products for providing digital signage networks adapted to include playlist spots configured to control content delivery of content stored remotely from the playlist spot.

Digital signage networks typically include a plurality of network locations that are geographically separate. The network location, for example, may be a branch of a service provider (e.g., a bank) or retail location (e.g., a department store). A network entity within the network location may be a media player configured to play spots within playlists according to a schedule. Each network location may include one or more network entities. The implementations of the present disclosure offer the ability to insert a content controlling spot ("CCS") within a media slot (also referred to as "slots") in a playlist, or in playlists of any kind, and the CCS includes intelligent content that enables the CCS to command control of delivery of media content stored remotely from the CCS. This enables the CCS to be inserted into any playlist and media content from disparate locations may be retrieved and played by the CCS or by a media player to which the CCS directs the media content.

A CCS with its intelligent content is differentiated from a media content spot ("MCS") containing video and audio content delivered to a media player for playback. Typically, the CCS controls delivery and playback of MCSs. In some implementations, the intelligent content of the CCS includes the ability to dynamically control MCSs delivered to players based on attributes associated with the MCSs and the CCSs may serve as placeholders, which can be dynamically populated. By associating a collection of attributes to MCSs, the MCSs may be played in a variety of CCSs stored within multiple playlists across multiple media players, as described further below.

In certain implementations, digital signage may be digital display devices or systems used to present information to a targeted audience. Examples of digital signage according to these implementations may include but are not limited to: electronic billboards, digital signage kiosks, mounted screens, and other display devices. Digital signage may also include systems or devices that fall under the category of out of home advertising. Digital signage may present a variety of content to viewers, including but not limited to flight status information, bus status information, train status information, advertising, wait time status information, menu information, daily specials information, content to attract customers, call center information, patient information, and other content.

In certain implementations, the digital signage is not a generic consumer computer and may instead be a special display apparatus connected to a content player. For example, the digital signage may utilize an embedded system to control playback. In this manner, the digital signage may require or consume fewer resources than a consumer electronics system and run more quickly or efficiently.

In certain implementations, digital signage may be networked to receive content remotely (e.g., remotely from a user directing content playback). For example, while the digital signage's display may be placed in a location with heavy customer traffic, a means for sending user input to the display may be located remotely from the display (e.g., in a back office, in another room of the same building, or located within another building). As another example, a plurality of digital signage may be remotely controlled by a control system remotely located from the plurality of digital signage (e.g., in another building).

Description of the Embodiments

FIG. 1A is a block diagram of a digital signage network 100 according to certain implementations. The digital signage network includes a network site 110 with a database 111, a processor 112, an input device 113 and a display 114. The network origination site 110 may be one or more general purpose computers, special purpose computers or both. The network site 110 may include one or more media players described below.

The database 111 may store: playlists (e.g., a sequence of media to be played or slots for being linked to media to be played on selected screens at selected sites based on a schedule); media slots for inserting into playlists including slots with filters and schedules; controlling content spots ("CCS") (e.g., a spot including intelligent content for querying content external to the playlist and directing play of the external content via the CCS or via a player); media content spots ("MCS") (e.g., an assembly of media within additional text, data or pictures) that may include spots with attributes); media (e.g., jpg, mov, and .swf files, including files that do not incorporate additional movie, picture, text or data files); filters (e.g., an attribute-based query or rule, attributes may be combined within the filter through Boolean logic operators); attributes (e.g., characteristics assigned to slots and spots such as secondary language spoken, regional affiliation, state, primary segment served or neighborhood type); attribute values (e.g., a subset or type of attribute attached to attributes such as German, Spanish, or Chinese for the secondary language attribute; urban or rural for the regional affiliation; Minnesota or New York for the state attribute; senior citizens, youth, Hispanic, males between 18-40 for the primary segment served attribute; and street front, mall, in-store for the neighborhood type attribute); schedules (e.g., a defined list of times to which playlists are assigned typically using time, date, day of the week criteria); and/or other information.

Figure 4A:
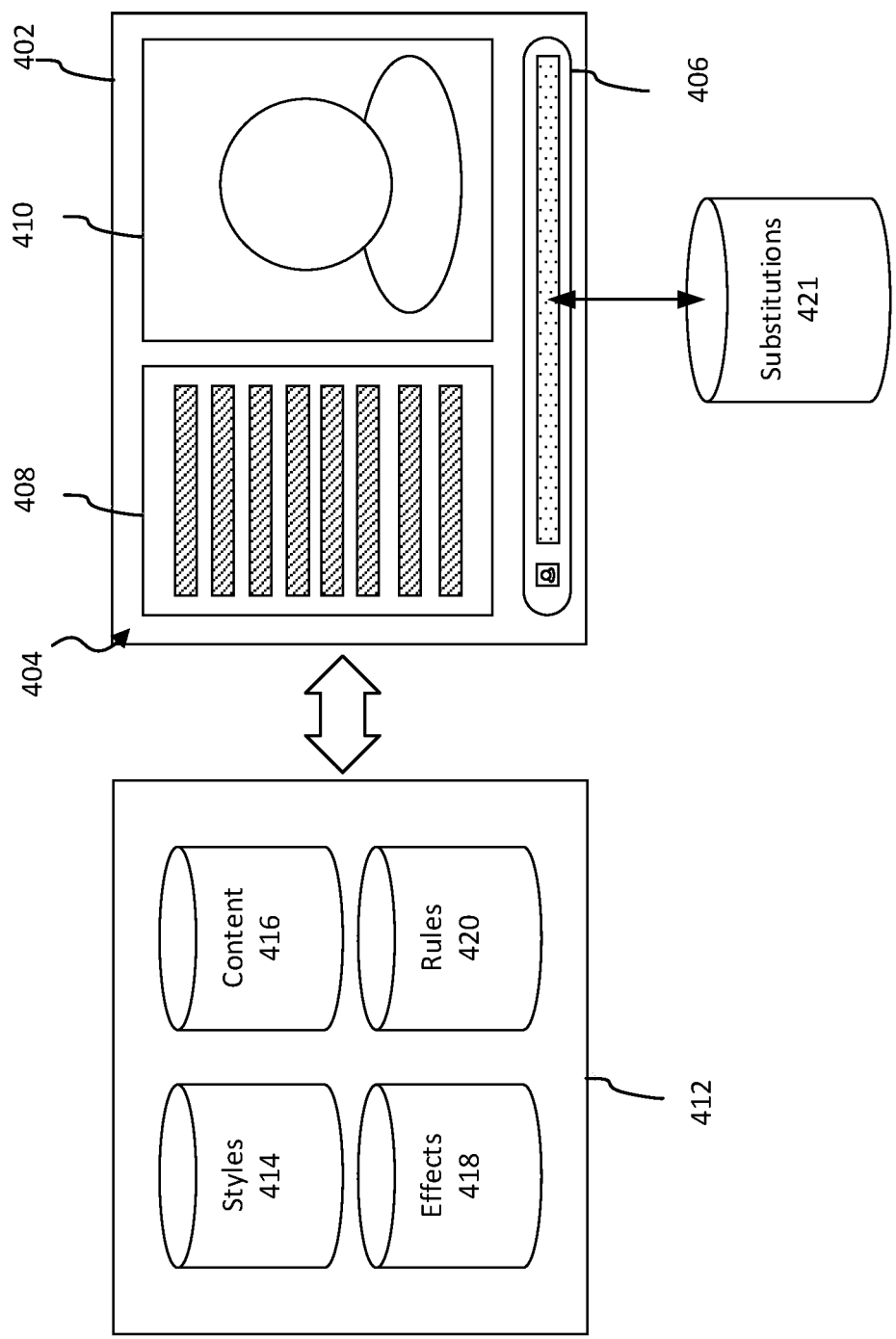
FIG. 4A illustrates a spot with an associated framework, according to certain implementations.

In certain implementations, the database 111 may store frameworks, styles, content, effects, and rules, for example, as described in this specification with reference to FIG. 4A. In addition, the information stored within the database 111 may be stored in multiple databases. The information may be accessible to users based on their privilege level. For example, a user's privilege level may enable the user to access none, some, or all of the information stored in the database 111.

The processor 112 of the network site 110 may be configured to execute instructions for generating, retrieving, editing, validating, storing, distributing, and playing playlists including playlists with CCS stored therein. The processor 112 may also execute instructions common to digital signage networks including but not limited to generating, retrieving, editing, storing and distributing media, spots, traditional playlists with predefined media assigned thereto, and/or schedules.

The input device 113 and display 114 may be adapted to enable a user to provide input for executing instructions including but not limited to creating user-specific content, scheduling and targeting templates that link directly to a CCS in a playlist, adding filters, attributes and attribute values to CCSs and adding attributes and attribute values to MCSs.

A network 115 is communicatively coupled to and adapted to receive and distribute content between the network site 110 and the network entities 120. The network 115 may be formed of communication means including but not limited to an Internet protocol network, a satellite linked network, intranet, wide area network and combinations thereof.

The network entities 120 may be geographically separate from one another, such as residing at a service provider or retail location, and includes a computer system (e.g., with a memory, processor and optionally an input device and display). The network entities 120 are communicatively coupled to and support at least one media player 125 but typically network entities 120 support multiple media players 125. In some implementations, the network entities 120 may include firewalls and other security modules that regulate information into and out of the network entity 120. In some implementations, the network entities 120 may be adapted to execute instructions associated with the network site 110 discussed above. For example, using the computer system of the network entity 120, spots and playlists may be edited and sent to media players 125 associated with the network entity 120.

In FIG. 1A, the media players 125 include a memory 127 and a processor 129 and are communicatively coupled to a display monitor 130. The memory 127 is adapted to store the schedules, playlists, CCSs, MCSs and channel information (e.g., a programming stream having playlists assigned thereto, such as a teller channel located proximate a bank teller's location or an ATM channel located proximate an ATM). The processor 129 is programmed to retrieve from the memory 127 the playlists based on the schedules and execute instructions according to the intelligent content provided in the CCSs for playing MCSs.

Figure 1B:
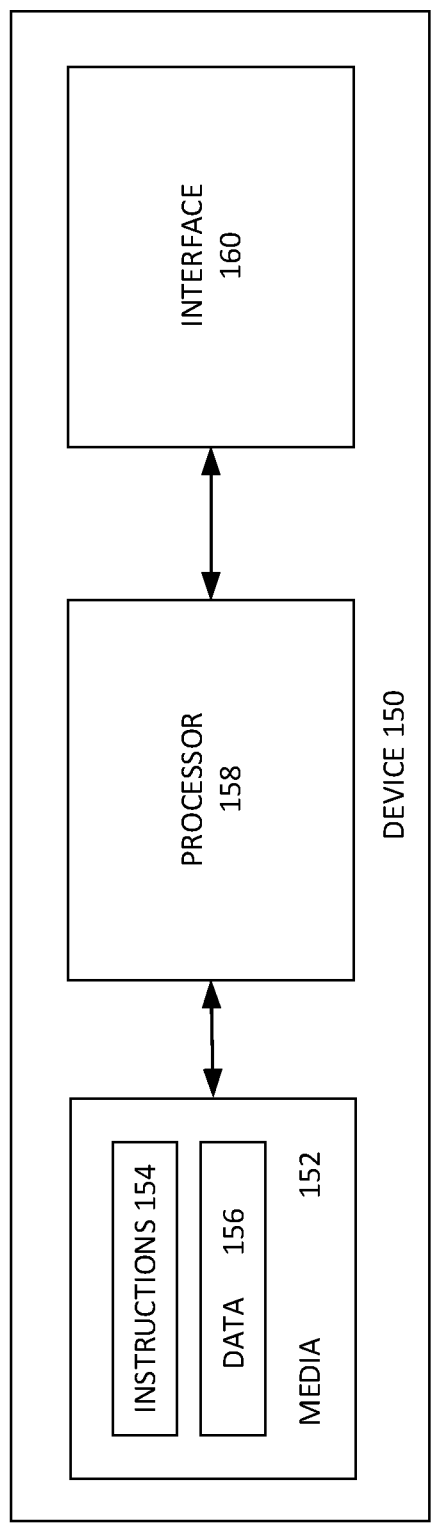
FIG. 1B illustrates a device comprising a media, a processor, and an interface, according to certain implementations.

FIG. 1B illustrates a device 150 comprising a media 152, a processor 158, and an interface 160. Certain implementations of the various systems, methods, embodiments, and implementations described herein may be implemented using the device 150.

The media 152 may comprise computer-readable media, such as transitory or non-transitory computer readable. For example, the media 152 may be a hard disk drive, a solid-state drive, a flash drive, an optical storage drive, and/or other storage means.

In certain implementations, the media 152 may be encoded with or otherwise comprise instructions 154 and data 156. The instructions 154 may be instructions capable of being executed on the processor 158 to produce a result.

For example, one or more of the methods described herein. As another example, the instructions 154 may cause the processor to receive signals from or send signals to the interface 160.

The processor 158 may comprise circuitry capable of executing operations. For example, the processor 158 may be a central processing unit capable of executing digital instructions stored on a hard disk drive.

The interface 160 may comprise one or more means for communicating with components other than the device 150, such as an input device for receiving input from a user, a network interface device for communicating with networked devices, a screen for displaying information, or other components.

A single playlist or series of slots may comprise several spots. Depending on how the playlist, slots, and/or spots were created, this content may be presented as a single piece of media.

Figure 2:
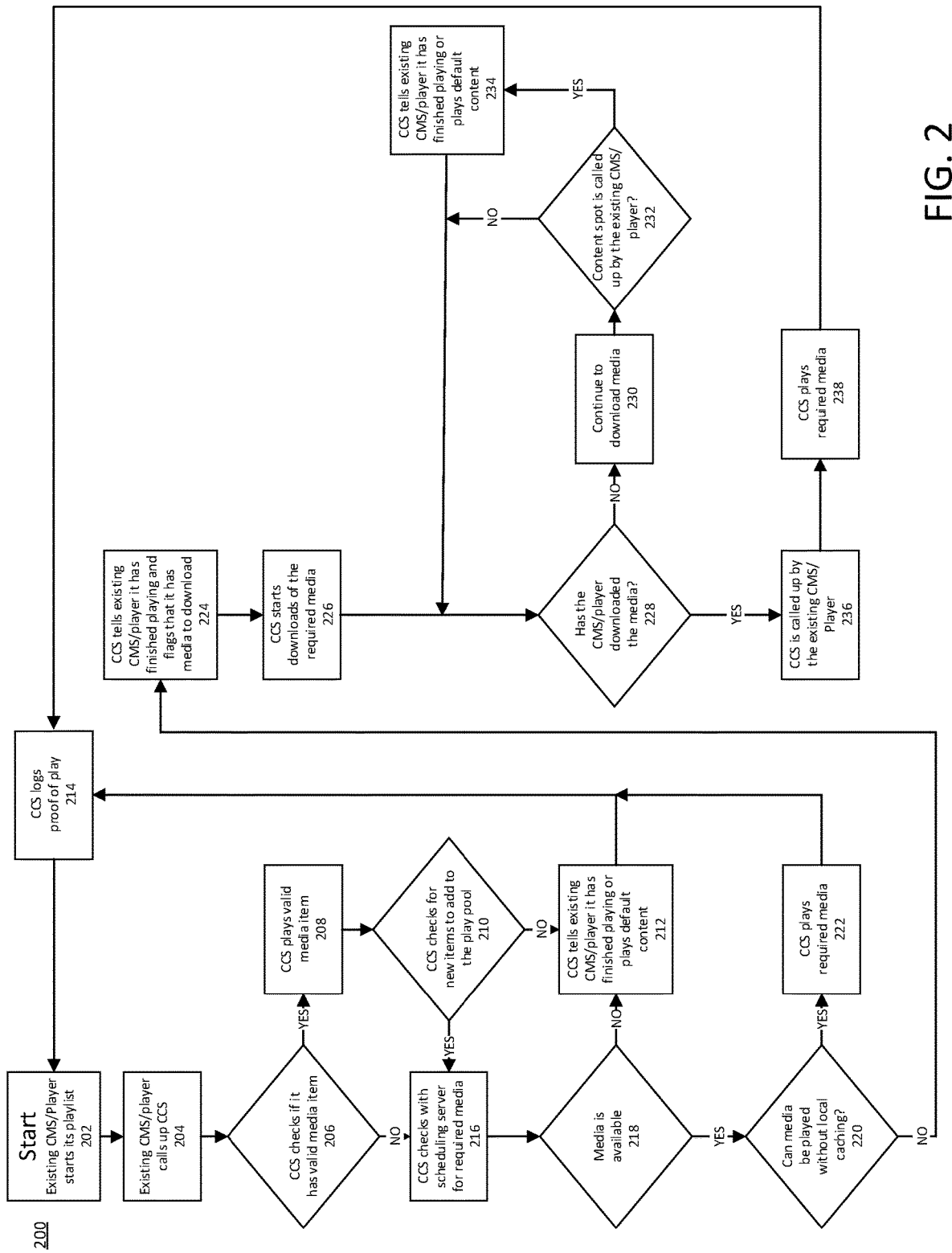
FIG. 2 illustrates a method of using controlling content spots ("CCSs") within a playlist control content delivery of content stored remotely from the playlist.

FIG. 2 illustrates a method 200 of using the digital signage network 100 in which a controlling content spot ("CCS") within a playlist controls retrieval and playback of content stored locally or remotely from the playlist. The method starts at the top left of FIG. 2 where a content management system or player starts 202 a playlist. The playlist includes a CCS. Generally, the CCS is distributed to one or multiple playlists in a manner typical to delivery of spots or content to playlists. For example, the content management system ("CMS") sends the CCS to a playlist generally, or to a slot within a playlist. In one approach, users may login to a CMS website and download one or more CCSs into playlists, e.g., local, regional and/or network-wide playlists.

The method of FIG. 2 continues when the CMS/player calls 204 the CCS in the playlist. The CCS intelligent content is initiated and the CCS determines 206 if the CCS itself includes a valid media item. The valid media item may be a MCS situated locally that may be a scheduled MCS or may be a default MCS. If the CCS includes the valid media item, the CCS plays 208 the media item and determines 210 if any new items are to be added to the CCS's possible play pool. If not, the CCS notifies 212 the CMS/player that the media item has finished playing it. In certain implementations, the CCS checks 212 for any other media items that may be candidates for playback by the CCS, and initiates a retrieval process before telling the CMS/player it has finished playback. The CCS may log 214 proof of play (e.g., this may be used for invoicing spots per use or general invoicing) and the process of FIG. 2 may start again.

Otherwise, if the CCS determines 206 new items are to be added to the CCS' play pool, the CCS queries 216 a scheduling server for required media. This step in the flow is also reached when the CCS does not include a valid media item. That is, when the CCS determines that it does not have a valid media item or when the CCS determines 210 new items are to be added to the CCS play pools, the flow continues to the step where the CCS queries 216 a scheduling server for required media. If media is not available from the scheduling server 218, default media may be played 212. For example, the default media may be a MCS stored locally at a player. When the default media has been played, the CCS notifies 212 the CMS/player that the media item has finished playing, may log 214 proof of play and the process flow of FIG. 2 may start again.

Where media is available from the scheduling server 218, the flow continues and the CCS determines 220 whether the media can be played without local caching. If so, the CCS plays 222 the media and the CCS may log 214 proof of play and the process flow of FIG. 2 may start again.

If the CCS determines 220 local caching is required, the flow continues by the CCS notifying 224 the CMS/player it has finished playing and flags that the CMS/player has media to download. The CCS then initiates 226 the download of the required media. The flow may proceed by the CCS determining 228 whether the CMS/player has downloaded the media, and if downloading is not complete, the CCS may continue 230 the download and query 232 whether a content spot (e.g., MCS) or other default spot has been called up by the CMS/player. If so, the CCS notifies 234 the CMS/player the content spot has finished playing or plays 234 default content and continues to re-check 228 whether the media is downloaded. Where the content spot has not played, the CCS continues to check 228 whether the media is downloaded. When downloading is complete, it is ready for playback when the CMS/player next initiates. The CCS with the required downloaded content is called up 236 by the CMS/player and the required media is played 238. The CCS may log 214 proof of play and the process flow of FIG. 2 may start again. Thus, the process 200 of FIG. 2 is implemented in a loop, but this process 200 is not limited to the looping operations shown and may loop at other points or may terminate at various points in the process 200 according to the present disclosure.

According to one implementation, once the CCS is called up in the playlist, the CCS queries a local or remote data file (e.g., an XML file or web service) to determine the content to be played and manage its delivery and playback. As the CCS reads the data file it determines the content the CCS should play and the CCS either plays the content if the CCS is able to play such content, or the CCS downloads the content to a location from which the CCS is able to control play of the content, and the CCS commands play of such content. The content played by the CCS may be a MCS or multiple MCSs. In some implementations the CCS may implement conditional playback logic based on identifying MCSs with attributes and values required by the data file.

The CCS provides advantages to prior approaches because a host system does not require the intelligent content stored within the CCS, but only requires that the host system contain the CCS itself. In addition, the CCS itself controls a portion of a playlist where the CCS is inserted. With this capability, playlists may otherwise remain unchanged, which may benefit systems that are otherwise difficult to modify. In a particular example, where the CCS is called up in a playlist, the CCS may command replacement of any or all of the content within the playlist using one or more MCSs identified from execution of the intelligent content of the CCS.

According to certain implementations, CCSs may dynamically command play of any of a number of spots based on the CCS intelligent content including filters, attributes, attribute values, linked data files, database references, URLs and combinations thereof. The CCS intelligent content may form a bridge between a respective CCS and a collection of MCSs. In some approaches, the MCSs may include respective spot filters, attributes and/or attribute values, linked data files, database references, URLs and combinations thereof. Where a MCS includes a number of bridging associations, CCSs having with any of these associations may command play of the media spot. In addition, where a CCS includes a number of bridging associations, the CCS may command play of MCSs having any corresponding association.

Figure 3:
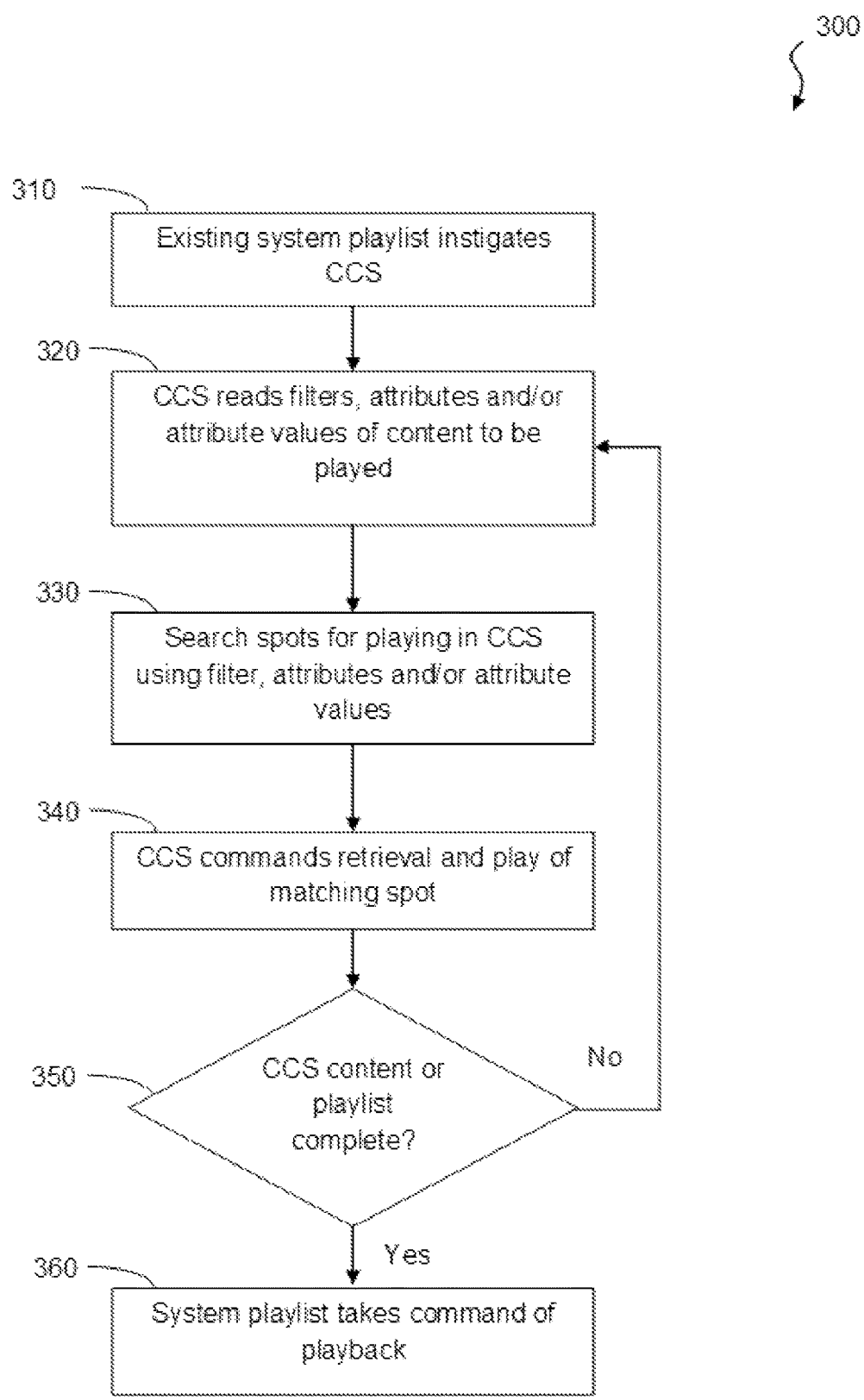
FIG. 3 illustrates a method of using the digital signage network in which media spots are played within playlists containing CCSs.

FIG. 3 illustrates a method 300 of using the digital signage network 100 in which media spots (e.g., MCSs) are played within playlists containing CCSs. In operation 310, an existing system playlist instigates a CCS. In some cases the system may instigate the CCS upon initiation of a playlist, while in other cases, the system may call up the CCS at some point during operation of the playlist. The CCS may include a data file or may query a data file containing a filter, attributes and attribute values or a database or a URL or a file reference, in operation 320. The filter, attributes and/or attribute values and/or a database or a URL or file references may be used by the CCS to search for a spot to play within the playlist in operation 330.

Because media spots may be stored separately from playlists containing the CCSs, the CCS may instruct the processor 129 to use the filter and attribute information when searching for spots stored in the memory 127, or elsewhere, having coinciding or matching spot attributes and attribute values. In addition or alternatively, the CCS may link to a media file with filter and attribute information used to locate spots. In addition or alternatively, the CCS may link directly to a media file, to database references associated with media files, and/or to URLs associated with media files. Separately storing the playlists with CCSs from the spots enables a single copy of a spot to be retrieved and be played in multiple playlists. Accordingly, in the present disclosure, the CCSs and the spots operate independently of one another, e.g., the two are separate entities, and are linked in circumstances where the spots and the CCSs share a common link, association or attribute. In a particular example, the CCS, or the data file queried according to the CCS intelligent content, may require a spot with a secondary language attribute and include Boolean attribute values of Spanish or French; and the processor 129, under direction of the CCS, identifies one or more spots having a secondary language attribute and an attribute value of Spanish as a coinciding spot in operation 320.

Continuing with the method of FIG. 3, upon locating a matching spot, the CCS instructs the processor to retrieve and play the matching spot in operation 340. For example, where the matching spot is stored within a local memory and caching is not required, the CCS may play the spot. Where the matching spot is remotely stored and requires caching, the CCS may retrieve and download the spot and play it. Where local caching is required, the CCS may play default content until the spot is downloaded or instruct the CMS/player to continue with its playlist. Where the matching spot is remotely stored and does not require caching, the CCS may play it.

Once the spot has been played, a determination is made as to whether the CCS content or playlist is complete in operation 350, and if not, the CCS continues to command retrieval and playback of content according to operations 320-340. When a determination is made that the CCS content or playlist is complete in operation 350, the system playlist takes command of playback of content in operation 360.

In further implementations, the CCS or the data file to which the CCS links identifies a schedule attribute and attempts to locate a spot with a corresponding schedule attribute. If the spot schedule coincides with the schedule of the CCS, the CCS instructs that the spot be retrieved and played. However, where a search of a spot with the requisite scheduling attributes is not located during the search, the CCS may skip the media slot such that content is not transmitted from the CCS within the playlist. The flow may then move to the next media slot and play media stored therein, or where the slot includes a CCS, may perform operations 320, 330 and 340.

Method 300 differs from traditional file naming and file matching operations used to execute playlists found in prior approaches because the filters or links associated with the CCSs within the playlists are adapted to allow any number of media spots to be played within the media slots, whereas the traditional file naming and matching operations target a single piece of media for playing within the playlist. Further, multiple attributes with their associated values may be assigned to CCSs or their associated data files and to media spots (e.g., MCSs). The attributes may be themed (e.g., secondary language, propensity to buy, geographic neighborhood type, primary segment served) and the attribute values may be linked by Boolean values including AND, OR and NOT. Attributes may be stored as metadata tags. Further, MCSs with their attributes differ from simple titles assigned to the media spots, because titles typically only serve as way for a user to identify the type of media content within the media spot, but the media player under the direction of the CCS does not play the media spot based on its title, but rather the spot is played in a playlist upon execution of the CCS when the spot's attributes match with the filter attributes of the CCS in the playlist or the data file or database or URL linking to the CCS.

In a particular example, one or more CCSs in the playlist or the data file linking to the CCSs may be assigned a Boolean filter in which the filter includes the attribute of "Language" and Boolean attribute values of "Spanish" OR "Greek." The filter therefore allows media spots having the attribute of "Language" and an attribute value of one of "Spanish" or "Greek" to be played in the playlist.

In another example one or more CCSs in the playlist or the data file linking to the CCSs may be assigned a filter of "Propensity to buy," an attribute of "Loans" and a value of "High." The filter associated with the one or more CCSs in the playlist or the data file linking to the CCSs allows media spots to be played that have an attribute of "Propensity to buy loans" and a value of "High." Alternatively, one or more CCSs in the playlist or the data file linking to the CCSs may be assigned a filter named "Propensity to buy," an attribute of "Loans" OR "Mortgage," each with an attribute value of "High." In this example, the aforementioned spot will play due to the matching "Loans" attribute.

In yet another example, a CCS in a playlist may be targeted for messages appropriate to the dominant customer segment (e.g., senior citizens, young adults, etc.) for a given network entity. In order for a spot to play in the CCS, the spot attributes must be related to a segment-oriented message.

Media spots may be targeted to the CCS within the playlist using a process that is independent from the targeting and scheduling of the playlist as a whole. In other words, the CCSs, playlists and the spots may be independently managed, potentially by different users in the network 100. Upon building a playlist, the playlist may be delivered or retrieved by one or more network entities. Subsequent installation of CCSs within the playlist in one or more players at the network entity enables the CCSs to command control of a portion of the playlist.

The CCS may be accessible to users of the network and may be configured to enable the user to create content for delivery by the CCS, schedule spots, e.g., MCSs, and target templates that link to the CCS. The CCS modifications may be enabled by providing user-specific functionalities based on user type. The functionalities may include content creation for a spot, such as updating a background, changing a headline or picture, selecting among titles, entering a data feed; content management, such as scheduling the content (or portion thereof) and targeting it to sites by means of meta-tags and attributes; workflow, e.g., setting in motion emails and approvals appropriate to the task at hand. In one example, a CCS user interface may be generated by uploading a file that follows a schema that determines which functionalities will be made available to the user.

Furthermore, a central, master user may cede control over the offered functionality to an array of users. For example, one user role may have the authority to update a background, and another to re-write the headline. These users each have defined permissions within the underlying CMS and these permissions may be carried forward as they make use of the CCS custom user interface. For example, if a Minnesota regional manager is given authority to update, schedule and target a spot using one of these custom interfaces, the span of targeting control will automatically be restricted to the Minnesota region based on the manager's permissions in the underlying CMS, even if broader distribution using the form's targeting component is attempted.

Accordingly, implementations of the present disclosure may provide CCS within playlists and the intelligent content within the CCS enable content remotely located from the CCS to be dynamically delivered to media players, and further provide the ability for users to create and target content to the CCS. In combination, this allows end users to overcome CMS management difficulties without making significant change to the CMS infrastructure.

Exemplary implementations provide a computer-implemented method, system and/or computer program product that delivers content using a playlist including a content controlling spot. One or more electronic databases store a playlist with a content controlling spot therein. The content controlling spot is a spot adapted to execute instructions for retrieving media files stored remotely from the playlist and to transmit the media files for playback. The content controlling spot may identify the stored media files for playback based on matching media attributes of the content controlling spot with media attributes of one or more media files or database references or URLs or file reference associated with media files. In addition or alternatively, a data file linked to the content controlling spot may be used to identify the stored media files for playing based on matching media attributes of the content controlling spot with media attributes of one or more media files or of database references or URLs associated with the media files. In addition or alternatively, the content controlling spot or an associated data file may link directly to media files or to database references or URLs associated with media files. Once a matching media file is located, the content controlling spot provides instructions to retrieve and play the media file. In further exemplary embodiments, the content controlling spot instructs that the media file be downloaded from a remote location. The content controlling spot may further instruct that default content be played during such downloading. The content controlling spot may log play of the media file. According to further exemplary embodiments, the content controlling spot may include a filter with a media attribute for targeting a media file type to be retrieved and played. The media attribute may further include an attribute value for targeting a subset of the media file type targeted by the attribute. Media files, such as media content spots, may be adapted to be retrieved and played under direction of the content controlling spots by the files including a media attribute identifying a media file type, which may optionally be combined with an attribute value identifying a subset of the media file type. The content controlling spot and/or the media file may also be associated with a play schedule. In yet further exemplary embodiments, the content controlling spot functionalities may be modified by a user and may include functionalities such as content creation, content functionality and workflow.

The users of the network may use a set of template tools in order to create CCSs, MCSs and other spots. The users may be remotely located from one another and the tools may enable collaboration in creation, update and maintenance of spots between users in disparate locations. Different users may have different roles and authorities over the creation of the spots. For instance, the users may have marketing manager, regional manager, branch manager, or other roles, each responsible for different aspects of spot creation. The users' roles may control which aspects of spot creation they may perform and which aspects of spot creation that they are prohibited from performing. The spot may be created according to a framework.

FIG. 4A illustrates a spot 402 with an associated framework 412. The spot 402 may be a CCS, an MCS, or other spot configured for display on digital signage. The framework 412 may be a structure that defines a range of possibilities for the spot 402. The spot 402 may be a particular implementation according to those possibilities. For example the framework 412 may be modified to be narrow to constrain how a user may create the spot. A narrow framework may be useful to enable users to create cohesive and consistent spots, for example, in accordance with a marketing or design plan. For instance, a marketing manager seeking to facilitate the creation of a cohesive media campaign may define particular frameworks for other employees to use to implement spots.

The spot 402 may comprise one or more content zones 404, such as a footer content zone 406, a text content zone 408, and an image content zone 410. The content zones 404 are regions capable of displaying content. The content zones 404 of the spot may, but need not, change over the course of the spot. For example, certain zones may appear, disappear, animate, or otherwise change over time. For instance, some zones may appear at the start of the spot but not be available at the end of the spot. Content may include one or more of the following or combinations thereof: text, images, video, animations, and other media. As illustrated, the text content zone 408 comprises text content, the image content zone 410 comprises an image, and the footer content zone 406 comprises both text content and an image. One or more of the following or combinations of the following may define the framework: data files, links to data files, media files, links to media files, database entries, and other information usable to define the boundaries of creation of a spot.

As illustrated, the text content of the footer content zone 406 is linked with substitutions 421. In certain implementations, the substitutions 421 are stored data that a spot may reference in order to generate a complete spot. The substitutions 421 may be stored in various local or remote locations, such as in a local server, remote server, on the content player, media player, or at other locations. In certain implementations, there may be multiple substitutions stored in different locations. The spot may be configured to choose a preferred substitutions file and, if it is not available, choose another substitutions file from a list of substitutions. In certain implementations, the spot may have default content that is used if a desired substitution is unavailable and/or if the substitutions 421 are unavailable. In certain implementations, the substitutions may be stored remotely from the spot which references them.

In certain implementations, the substitutions 421 may be stored in an XML format, a lookup table, as key-value pairs, or through other means. Example substitutions 421 may include information relating to the name of the branch manager, the location of services near the signage on which the spot is playing, and other information. The spot may then draw information from the substitutions 421 when the spot is being displayed, when the spot is being prepared for display, when the spot is being created, and/or at other useful times.

In certain implementations, the substitutions may be used to fill in or populate particular areas of the spot (e.g., by providing additional content for filling gaps in content of the spot, such as a prewritten text). For instance, the substitutions may be used to replace placeholder content. As another example, the spot may contain instructions or otherwise be configured to display the following text: "Welcome to [NAME_OF_BANK].", where [NAME_OF_BANK] is a link or other kind of reference to a particular piece of data stored in the substitutions 421. The reference to the substitutions would be replaced with the relevant information pulled from the substitutions 421 for display on the spot. For instance, the referenced substitutions may be local to a bank called "A. Bank" and the substitutions may cause the spot to be displayed as "Welcome to A. Bank." The substitutions 421 may be locally customized. For instance different branches may have different substitutions 421 (e.g., in a different location, the spot may be displayed as "Welcome to A.N. Other Bank", where the substitution is referenced by [NAME_OF_BANK] is "A.N. Other Bank."). There may also be separate substitutions 421 specific to a particular level. For instance, there may be substitutions for a local bank, a particular city, a particular state, a particular region, a particular country, and so on. In this manner, the substitutions can be set and/or changed at an appropriate level of specificity. This may be particularly useful in situations, where it is desired that different locations have the same text (e.g., a legal disclaimer particular to a certain state or country).

The substitutions 421 may be useful for several purposes. In certain implementations, the substitutions 421 may be used for providing hyperlocalization in situations where it is undesirable to wait for local individuals to update text and/or where the permissions level of local individuals is limited. For example, the regional manager may want to prevent local branch managers from modifying text but would still like the text of a spot to be customized for each branch. Using references to the substitutions 421 in a spot, the branch manager could use the references to have the spots display customized information without needing to give local branch managers edit control over the text. The result is that one spot can be created that contains specific references and information at the branch.

In certain implementations, the substitutions 421 may be used to automatically update spot information based on current conditions without needing user input. For example, a spot could have text configured to read "For loan services, please see [CURRENT_LOAN_EMPLOYEE] at the loan window to your [LOAN_WINDOW_DIRECTION]" when the loan service window is open and configured to read "The loan services window is currently closed. The window will open at [NEXT_LOAN_SERVICE_TIME]." when the window is closed. The substitutions 421 may be configured to interact with employee databases or other sources of information. For example, the "[CURRENT_LOAN_EMPLOYEE]" substitution could be updated based on which employee is working that day, which employee is currently logged into the computer at the loan services window, which employee is currently available, or based on other information. In this manner, the spot may adapt to current conditions and need not rely on scheduling information alone, which may be out of date. The spot may also display the availability of multiple employees. The [NEXT_LOAN_SERVICE_TIME] may display the next time that the loan service window will be open. For example, the substitution may change based on the current time of day and availability of the loan service window. As another example, the substitution may be changed to an estimated return time if the employee is on a break. In certain implementations the substitution may be updated based on calendar information to, for example, take into account public holidays, scheduled closings, or other events (e.g., there may be a greeting substitution that changes a greeting based on the nearest holiday, such as New Year's Day).

In certain implementations, the spot 402 itself may store or otherwise comprise information relating to itself. For example, the spot 402 may comprise information relating to the position, size, shape, type, visibility, and other attributes of the content zones 404. The spot 402 may also store information relating to which portions of the framework may apply to itself and/or to the content zones 404. The spot may also store its own content. For example, an image in the image content zone 410 may be stored locally to the spot. The spot 402 may also store and/or be assigned attributes and other metadata, for example as described previously.

In certain implementations, the spot 402 may store references to content or attributes instead of or in addition to storing that data locally to the spot 402. For example, the spot 402 may comprise links or references to data stored externally to the spot 402, such as on a remotely located server.

In certain implementations, the framework 412 may comprise styles 414, content 416, effects 418, and rules 420. These components may be used to define the boundaries of creation of the spot 402. The styles 414, for example, may define various style attributes which may be applied to the spot 402 and/or the content zones 404 of the spot 402. For instance, the styles 414 may define the colors, font types, font sizes, text spacing and other style attributes.

The content 416 may define a repository of pre-created content or other media made available during the creation or modification of the spot 402. For example, the content 416 may include a company's logo, images of employees, images of locations, stock images, particular text, audio, video, and other content. The content 416 may be used to ensure consistent usage of content across spots. For example, the content 416 may include a vector image of a company's logo image so all spots use a consistent, high-quality logo. As another example, the content 416 may include stock or other images to which the company owns or licenses rights. As yet another example, the content 416 may be text, such as a quote, a mission statement of a company, a legal disclaimer or other textual data that may benefit from consistent usage across spots. Consequently, the content 416 may be treated as a curated library of approved content to prevent copyright infringement or other undesirable effects of using non-approved content.

Although the content 416 is discussed as part of the framework 412, the spot need not be limited to only the content 416. Users may upload or otherwise use other content to create the spot 402.

Depending on the extent to which content 416 is part of the framework, it may be desirable to store the content 416 separately from a data file of the framework 412, such as on a server or other repository. In such an instance, the framework 412 may include instructions that a system may use to retrieve the content 416 for use with the spot 402.

The effects 418 may be visual effects capable of being applied to the spot 402. The effects 418 may be used to make the spot more visually appealing or eye-catching to a viewer. For example, the effects 418 may be animations that may be applied to content of the spot. The effects 418 may also be capable or used to modify the display of the content. For instance, the effects 418 may saturate, desaturate, or otherwise change the color of the one or more portions of the spot 402. In another instance, the effects 418 may blur, pixelate, mask, darken, lighten or otherwise change the visibility of portions of the spot 402.

The effects 418 may also define transitions. The transitions may define the ways to or from which the spot 402 may be transitioned. For instance, the transition may define animation effects (such as an animation stored as part of the effects 418) that occur when the spot appears or disappears. The transition may also define particular spots to or from which the spot 420 may transition. For example, a spot that advertise a contest may be limited the types of slides that follow it to slides relating to the rules for the contest.

The rules 420 may be a set of governing, enabling, and/or limiting characteristics of the spot 402. For instance, the rules 420 may comprise editable feature rules assignable to one or more content zones 404 of the spot. The editable feature rule may define whether and in what way the one or more content zones 404 may be changed. The editable feature rule may prevent certain users from making certain changes to a particular region. For example, there may be an editable feature rule that prevents a branch manager from changing content that was set by the marketing manager. As another example, the editable feature rule may prevent a user from moving or deleting content without having a correct permission level. As yet another example, the editable feature rule may be used to prevent a user from placing content not present in the content 416 of the framework 412 in a content zone.

The rules 420 may comprise scheduling rules. The scheduling rules may be rules governing when and/or where the spot may be played, which may include date, time, frequency, and location information. For example, the scheduling rules may prevent a spot 402 from being played on the weekends. As another example, the scheduling rules may permit digital signage to play the spot 402 until a certain date and then no later. As yet another example, the scheduling rules may prevent the spot from being assigned to be played during certain hours. The scheduling rules may also be used to prevent a spot from being played too soon after the last time it was played. For instance, a spot may be prevented from being assigned to a slot that is scheduled to be played less than fifteen minutes after the last time the spot was played. In another instance, a spot may be prevented from being played more than a certain number of times per hour. As another example, scheduling rules may limit playback to particular locations or digital signage.

The rules 420 may also comprise linked-content rules, which prevent or require certain content based on whether other content is present in the spot 402. For example, a spot 402 may require particular content to be present when particular other content is present. For instance, the linked-content rule may prevent a spot from displaying particular advertising content without having a certain legal disclaimer. As another example, the linked-content rule may prevent the spot 402 from including incompatible content. For instance, the linked-content rules may prevent a spot 402 from displaying incompatible legal disclaimers.

A user may modify, assign, and/or allocate the rules 420. For example, a user may apply particular rules to content zones, or elsewhere within a spot. In addition, a user may assign roles or permissions to other users. The permissions may be related to the editable feature rules or scheduling rules. For example, a user may have a high permission level, which may enable the user to have broad abilities to edit a spot. A user may have a low permission level which may minimize the user's ability to modify a spot. In certain implementations, a user's permission level may be associated with a user's role in a company and be stored with, loaded from, or determined by a user's personnel entry in a personnel management database.

Figure 4B:
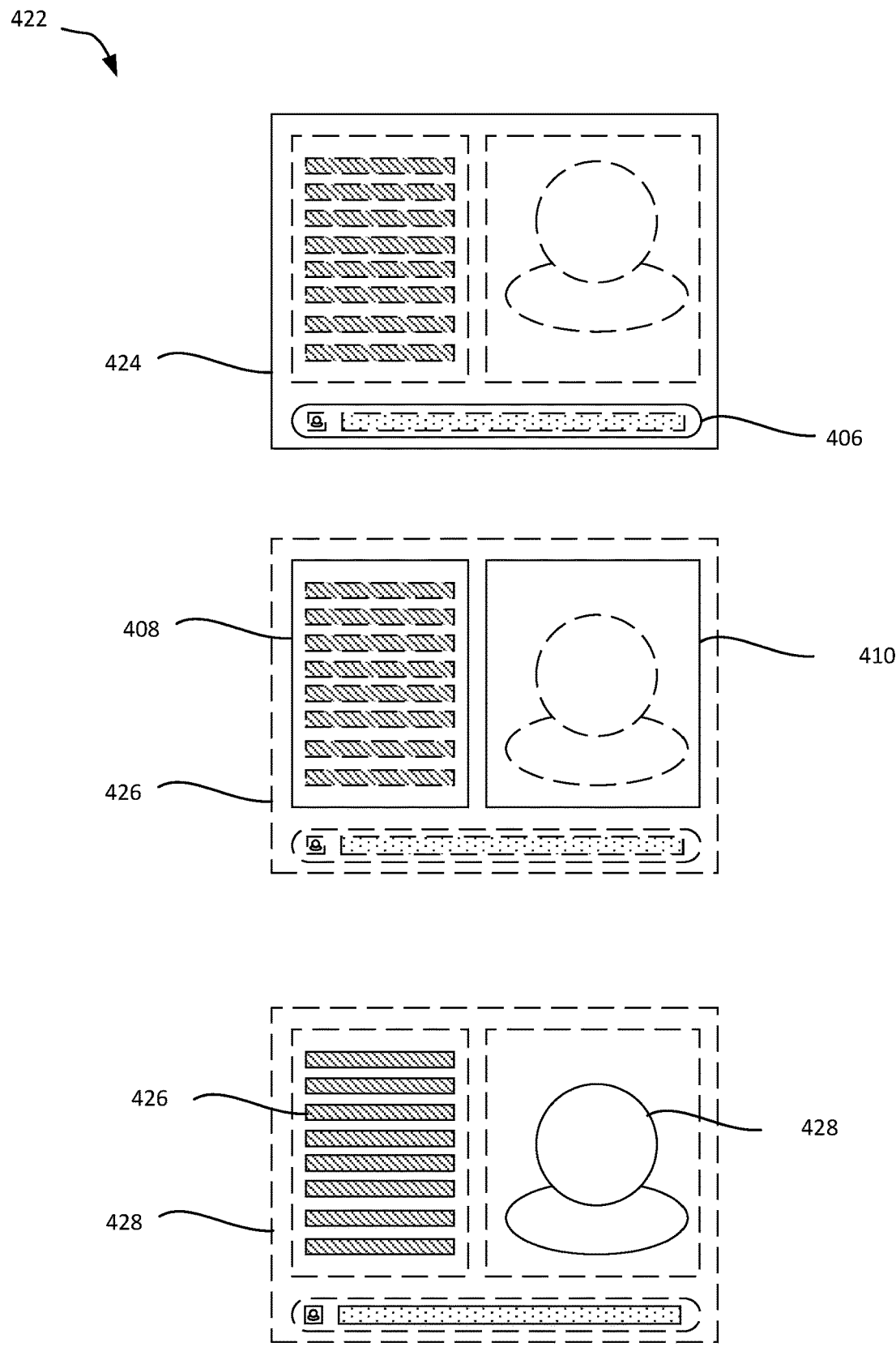
FIG. 4B illustrates a spot split into layers, according to certain implementations.

FIG. 4B illustrates a spot 402 split into layers 422. The layers 422 may be groups, designations or other combinations attributes of a spot 402. In certain implementations, the layers 422 may be an organization system for the attributes of the spot 402. For example, each of the content zones 404 may be in a separate layer. As another example, layers 422 may be used to group similar content zones 422. For instance, the layers 422 may split the content zones according to location, content, subject matter, intended purpose, and other means of distinguishing or grouping content.

Different layers 422 may be associated with different frameworks 412. For example, a first layer may be associated with a framework enabling broad options for changing the effects, styles, content of the spot 402 while a second layer may be associated with a more limited framework.

The layers 422 may be used to arrange attributes of the spot 402 according to rules, such as rules 420. For example, different layers 422 may require different permissions to be changed. For instance, a first layer may require at least regional manager permissions to be changed, while a second layer may require at least branch manager permissions to be changed. Changing a layer may include changing content zones 404 associated with the layer. Changing a layer may also include changing which content zones 404 or attributes apply to a layer.

Regardless of the divisions, the layers 422 may enable organization of not only content but also duties or tasks. For example, a user may split a spot into various duties and divide the duties among other users for further action. For instance, a regional manager may be delegated a layer that comprises the overall look, feel, and location of the spot 402 and its content, while a branch manager may be delegated a layer that defines the actual text that is placed within the content zones 404 of the other layer. In such a manner, a branch manager may enter branch-specific text but may be unable to modify the shape or location of the content zone holding the text. By contrast, the regional manager may modify the shape and location of the content zone. Depending on the configuration of the layers and the various rules corresponding to the layer, the regional manager may be able to add text to the content zones, add comments to the content zones, add undeletable text to the content zones and other actions.

The organization of duties and tasks may enable a reduction in the time needed to implement changes and deliver content. For example, as described above, a branch manager may be given permission to change actual text that is placed within a content zone, but not to modify the shape, color, location, and other attributes of the content zones or the layout of the particular spot. In this manner a regional manager need not review the changes made by the branch manager because the branch manager's scope of permitted authority is limited and effectively prevents the branch manager from "breaking" the spot. In other words, for example, the branch manager would not be able to modify the spot in a way that would cause the system to crash, cause the spot to violate design guidelines, or in other ways that would be undesirable. The scope of authority may be sufficiently limited that the branch manager could be permitted to modify and publish the spot without needing to ask permission or authority from someone else. The branch manager would also not need to ask someone else to make the change. This organization method would also simplify the user experience and result in more streamlined training of employees. Continuing the branch manager example, the branch manager would not need to be trained in techniques or rules that go beyond the scope of permitted authority.

In certain implementations, the spots may have a default schedule, location, and/or content. The defaults may be used unless otherwise specified by a user (e.g., default content will be used unless otherwise specified by the user). The use of defaults may enable users to focus on particular important aspects, such as those aspects needed to complete a particular update. In certain implementations, all content, schedules, and/or locations may be set with default values or data. In this manner, the content, schedules and location information of the spot need not (but may) be modified by another user before it is displayed. This may advantageously enable content to be played more quickly than it otherwise would have. For example, a regional manager may prepare a spot with default content and publish it. The spot, if so configured, may automatically be displayed on subscribed signage. A branch manager having permission to edit the spot may, but need not edit it.

In certain implementations, permissions may be based on security and/or clearance level. The content of a spot may be tagged with particular security settings. For example, the spot may be designated as not to be displayed before a certain date or to not be displayed in particular locations. A particular permission level may be required to override the security settings. For example, a regional manager may provide a restricted spot to a local manager. The local manager may have permission to set the location and schedule of the spot, but not be allowed to provide a setting that would violate the rules set by the security setting.

FIG. 4B illustrates the spot 402 in three layers: a first layer 424, a second layer 426, and a third layer 428. FIG. 4B illustrates the content of a layer with a solid line and content not included within the layer as a dashed line. Depending on the configuration of the system, non-included content may have different effects on the layer. For example, the dashed content may simply not be shown to a user. In another example, the dashed content may be visible but uneditable or unchangeable.

The first layer 424 comprises the footer content zone 406 and the general outline of the spot 402. The second layer 428 comprises the text content zone 408 and the image content zone 410. The third layer 428 comprises the image 428 of the image content zone 410, the text 426 of the text zone 408, and the image and text of the footer content zone 406.

Figure 5:
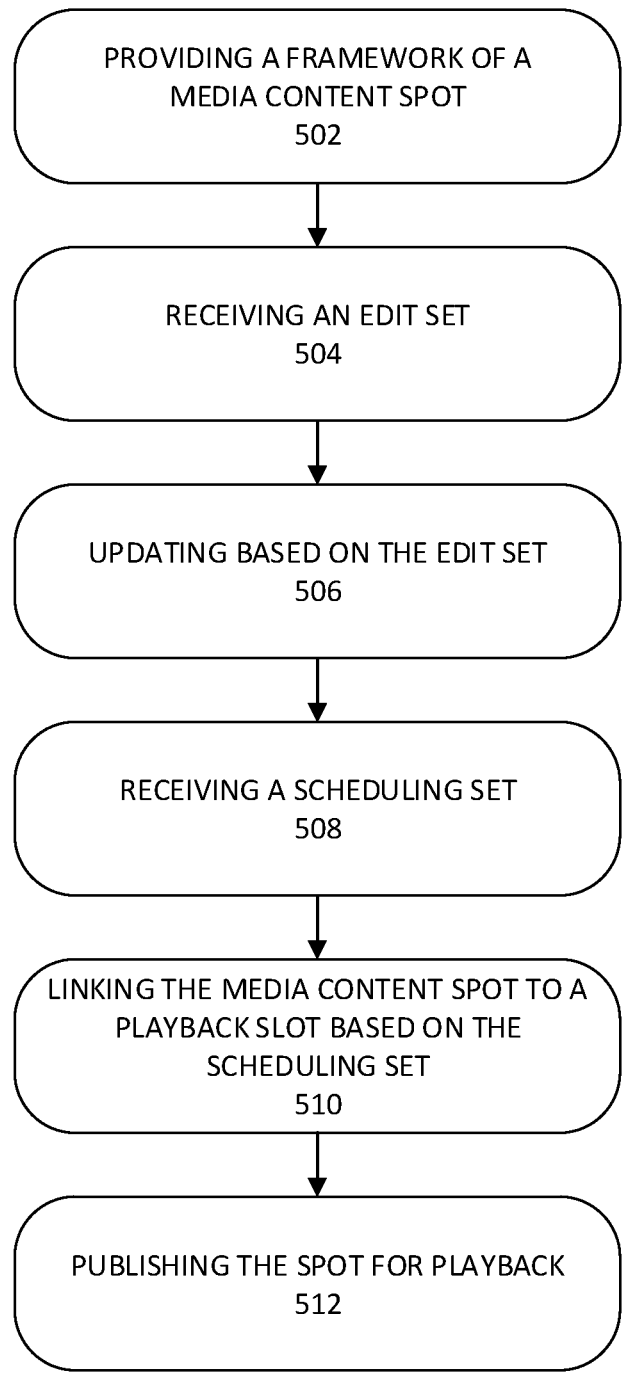
FIG. 5 illustrates a method for generating a spot for display on digital signage according to certain implementations.

FIG. 5 illustrates a method 500 for generating a spot for display on digital signage according to certain implementations. In certain embodiments, the method 500 may comprise the steps of providing a framework of a spot 502; receiving an edit set 504; updating based on the edit set 506; receiving a scheduling set 508; linking the spot to a playback slot 510; and publishing the spot for playback 512.

The step 502 may comprise providing a framework of a spot, such as providing a framework of a spot to a user. The framework may be a set of rules and or content that define the boundaries of creation of a particular spot. For example, as described with reference to the framework 412.

The framework may be provided in various ways. For example, the framework may be provided by presenting the user with a user interface and enabling the user to interact with the framework over the user interface, such as a content zone editor portal. For instance, the user interface may be a part of a webpage, a downloaded software program, a smartphone application or other means for providing an interactive experience with the user. In addition the various attributes of the framework 412 may be customized and/or assigned over the user interface.

In certain implementations, the user may be able to download, be directly sent, or otherwise be provided the framework or access to the framework. For example, the user may download a framework hosted on a server. As another example, an email may provide the user with the framework. In other implementations, the spot may be provided to the user in a similar manner as the framework.

The step 504 may comprise receiving an edit set. The edit set may be a representation of changes, updates, modifications, creations, and other edits relating to the spot. For example, the edit set may be a digital file that includes the changes. For instance, the user may be provided with a downloaded file of a framework or a spot. The user may modify the downloaded file and send the file to a destination as an edit set. In another instance, the downloaded file may be used to create a second file based on the downloaded file.

As another example, the edit set may be received as a command. For instance, the edit set may be received as one or more signals, commands, instruction sets, files, data, packets or other means for specifying commands. As a specific example, the framework and/or spot may be provided over a web interface configured to enable the user to interact with the framework, spot, or user interface as a whole. The user input may be converted into digital signals as the edit set. The user input may be received at a server, a local computer, software or at other locations. The edit set need not be limited to specifying edits to existing spots or frameworks. The edit set may include newly created edit sets or spots.

Receiving the edit set may be facilitated by presenting to the user a reference map showing one or more of the content zones of the spot. The reference map may be a preview of a rendered or finalized spot based on the current settings, content, and attributes of the spot. The reference map may also illustrate which portions of the spot (e.g., content zones) that the user may edit without violating the rules 420. In addition or instead, the reference may illustrate which edits that have already been made violate the rules.

The edit set may be regulated by the rules 420 and/or the permissions level of the user that created the edit set. In certain implementations, the regulation may be accomplished by limiting the options available to a user. For instance, a regional manager may only be able to schedule the spot for playback at digital signage within the region controlled by the regional manager. As such, the digital signage of other regions may not be visible as assignment options when the regional manager is prompted to schedule the spot. By limiting the options visible to the user, the edit set is regulated.

In certain implementations, the edits contained with the edit set may be checked against the rules 420 of the spot 402 and the permissions level of the user. If the change is not permitted by the permissions level, then the user may be alerted that the change is not permitted, the change may not be made, and/or other actions may take place.

The step 506 may comprise updating based on the edit set. For example, the spot may be updated based on the edit set. For instance, software running on a web page or locally may make the updates. In another example, the framework is updated.

The step 508 may comprise receiving a scheduling set, such as receiving scheduling information relating to the date, time, frequency, and other information relating to the playback of the spot. For example, the scheduling set may include dates on which the spot may be played and an hour range between which the spot may be played. As another example, the scheduling set may contain scheduling information within the boundaries of the rules 420 of a framework 412 relating to the spot.

Receiving the scheduling set may be facilitated by presenting to the user a scheduling options map showing one or more available options for scheduling the spot. In certain implementations, receiving the scheduling set may be facilitated by presenting a user with a scheduler portal that enables associating a playback schedule with a spot, slot, or other media component. The scheduling options map may be a preview of a calendar showing playback availability based on time. The scheduling options map may also illustrate various target locations where the spot may be targeted. The scheduling options map may illustrate which dates, times, and/or locations that the user may assign the spot without violating the rules 420. In addition or instead, the reference may illustrate which schedules that have already been made violate the rules 420.

In certain implementations, the scheduling set may be regulated by the rules 420 and/or the permissions level of the user in a similar manner to the edit set, as described herein.

The step 510 may comprise linking the spot to a playback slot based on the scheduling set. Step 510 may include inserting the spot into a media slot within a playlist (for example, as described in the specification in reference to the contents of database 111). This may also include making the spot available to being chosen by a CCS within the boundaries of the scheduling set.

In certain implementations, the linking of a spot and/or a template to a playback slot is performed when a template is uploaded and readied for use. For example, when a template is uploaded, the template may be assigned or associated with an attribute such as a theme and/or sub theme, which may be used to link the template or a spot using the template to a matching slot (e.g., based on the themes or subthemes). The match may exist at the time the template is uploaded, a spot is created, or at some other time. For example, at the time a template is uploaded with a particular theme, there may be no matching slots or no attributes associated with the slots that match the attributes of the spot and/or template. However, if a matching slot is created in the future, the spot and/or template maybe assigned to the slot automatically. For instance, at any future point in time that still falls within a schedule given to a published template. In some implementations, a slot in a playlist is made ready through a separate event and/or interface. In certain implementations, a spot is played and/or assigned for playback using the systems and methods described previously in reference to FIGS. 2-3.

The step 512 may comprise publishing the spot for playback. This may comprise making the spot available for playback. In certain implementations, the spot may be placed in a location accessible by digital signage for playback. For example, the spot may be placed on a networked location, which digital signage may download or otherwise access the spot for playback. As another example, the spot may pushed to local media (e.g., at the digital signage or a content player for the digital signage) for playback.

In certain implementations, the step 512 may further comprise merging the layers of a spot together to for a complete spot, which may include reconciling or otherwise addressing differences in the content of different layers. This step 512 may also include rendering or otherwise preparing the spot for playback at digital signage, such as converting the spot from an easy-to-edit format to a rendered video or image.

In certain implementations, the merging of layers of a spot, successive edits to the same spot, or multiple spots created from a framework may be treated according to an overriding mode. In this mode, successive edits merge together with user permissions controlling what zones may be edited and in what locations the edits appear. This mode may enable collaborative output and be useful to enable collaborative decentralized user communities. In certain other implementations, each use of a framework to create a spot results in the creation of a new spot, rather than an overriding spot. This use may enable non-collaborative output, such as output desired by head office users.

Figure 6A:
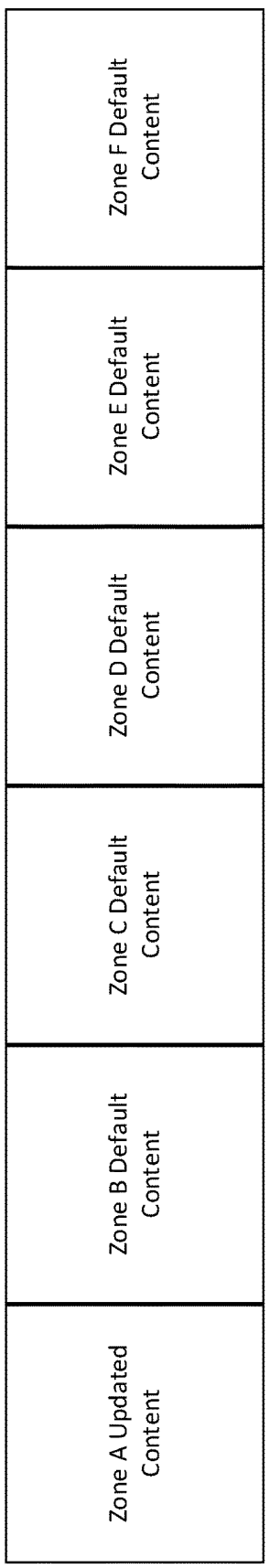
FIG. 6A illustrates an example series of content represented as a single piece of media according to certain implementations.

FIG. 6A illustrates an example series of content represented as a single piece of media comprising a plurality of content spots, according to certain implementations. While such an implementation may be beneficial to users desiring to understand the context of a particular zone or change, if a user wanted to edit Zone D, for example, the user may first need to scrub through the media to find the start location of Zone D. If the user wanted to preview the changes made to Zone D, the user may be required to watch or otherwise pass through Zones A, B, and C before reaching Zone D.

Figure 6B:
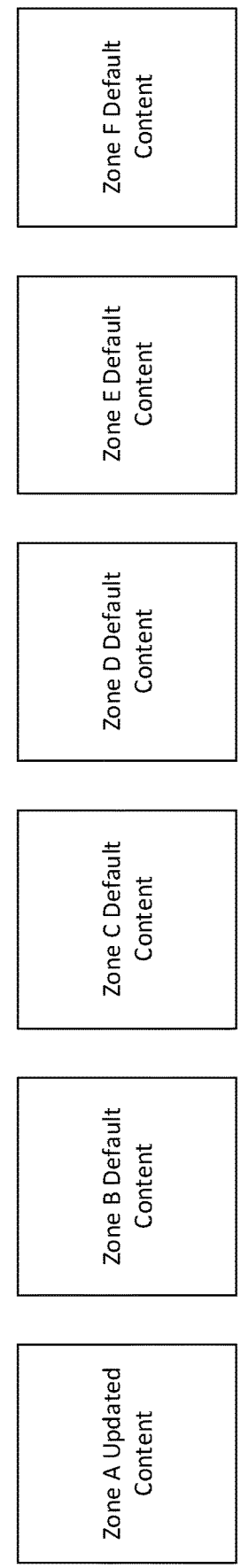
FIG. 6B illustrates the example series of content of FIG. 8A split into discrete zones, according to certain implementations.

FIG. 6B illustrates the example series of content of FIG. 6A split into discrete zones. With the zones separated, a user may play, edit, preview, or otherwise interact with single zones rather than the entire single continuous media. The splitting of the media may be performed, for example, automatically by a content creation tool upon uploading a single piece of media to the tool. The splitting of the content may be based on metadata of the media (e.g., start and end times for the various zones); flags or other markers corresponding to the beginning and end of the zones; style, visual, or other differences between zones; or through other means.

Figure 7:
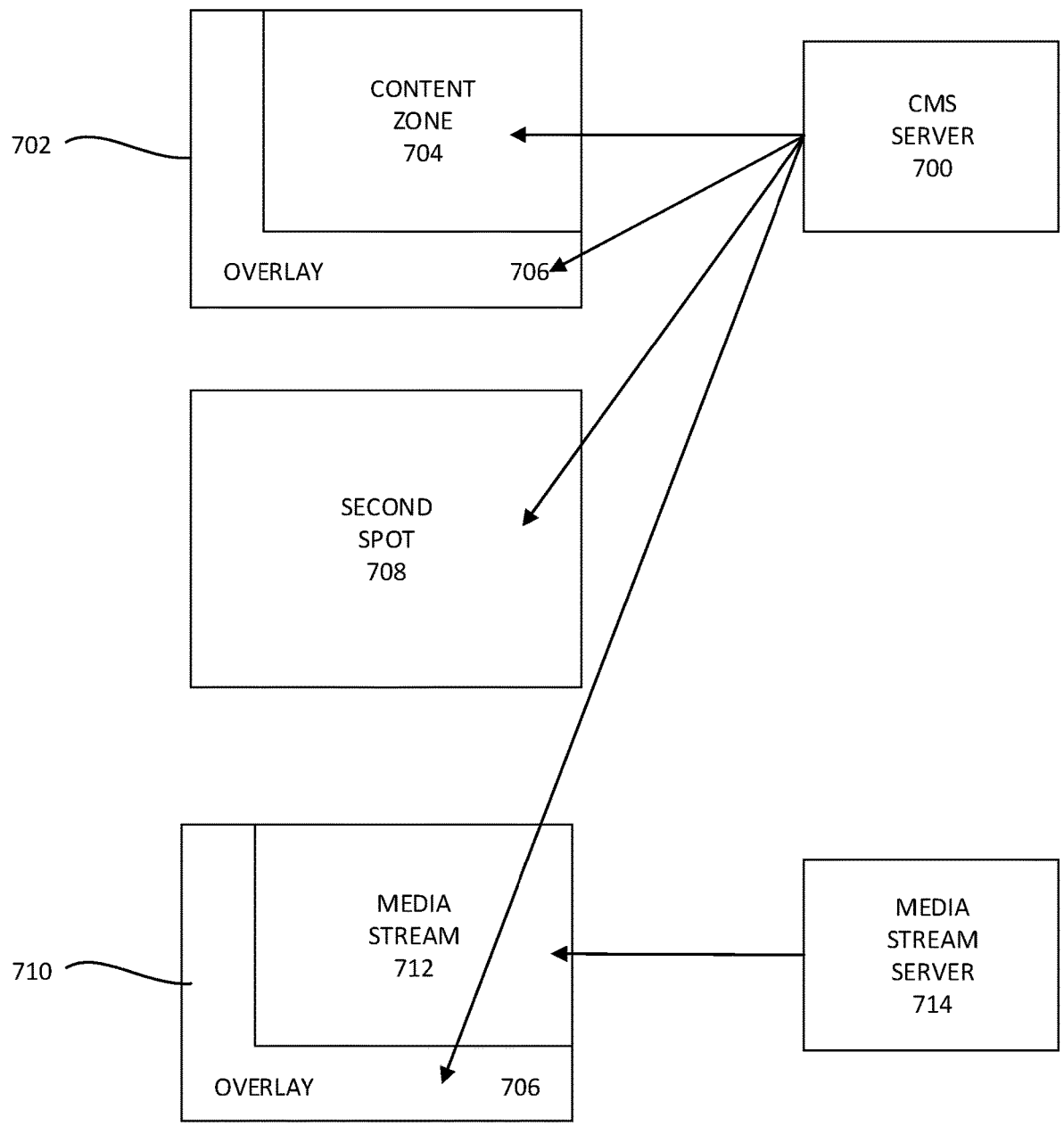
FIG. 7 illustrates certain implementations of spots and sources of content.

FIG. 7 illustrates certain implementations of a spot wherein content is provided by a media stream with arrows indicating sources of content or control. For example, three different kinds of spots may be provided: a first spot 702, a second spot 708, and a third spot 710. The first spot 702 includes one or more content zones 704 and an overlay 706, each corresponding to a content management system (CMS) server 700. The second spot 708 may be a spot that does not have an overlay. The second spot 708 also corresponds to the CMS server 700. The third spot 710 may be a spot that includes an overlay 706 and a media stream 712. The overlay 706 corresponds to the CMS server 700 and the media stream 712 corresponds to a media stream server 714.

The CMS server 700 may be a device or system that enables the playback and management of content on digital signage. For example, the CMS server 700 may have similar functionality to the network site 110 as described above with reference to FIG. 1A.

The overlay 706 may be a region for displaying content. The overlay 706 need not necessarily be related to the content zones 704. For example, the overlay 706 may present weather information while the content zones 704 present news content. In this manner the content zones 704 and the overlay 706 need not draw from the same content source. For example, the first spot 702 may be made up of or controlled by two different spots. For instance, the content displayed in the content zones 704 may be controlled by one spot and the content displayed in the overlay may be controlled by a separate spot. In this manner the playback of content for the content zones 704 and the overlay 706 may be controlled by different playlists or sources.

In certain implementations, the overlay 706 may be a lower-third graphic superimposed over the content zones 704. In certain other implementations, the content zones 704 may be scaled to a smaller size and the overlay 706 may fill-in the remaining screen space. For example, the content zones 704 may have a 4:3 aspect ratio and occupy 100% of the screen. The content zones 704 may then be scaled to occupy 70% of the screen while remaining at the 4:3 aspect ratio. The overlay 706 may then fill-in the remaining 30% of the screen. Depending on the aspect ratio and other characteristics of the screen, the overlay 706 may take non-rectangular form. For example, the overlay 706 may be L-shaped.

The media stream 712 may be streaming media content. For example, the media stream 712 may be broadcast television media, digital streaming media, or other media. As illustrated, the media stream 712 receives content from or is otherwise controlled by the media stream server 714.

In certain implementations, the media stream server 714 may be a content management system server similar to CMS server 700. The media stream server 714 may be a specialized content server for media streams 712. For example, the media stream server 714 may be a device capable of receiving cable or antenna-based broadcast television.

Although FIG. 7 illustrates the media stream server 714 as directly linked to the media stream 712 and the CMS server 700 linked to the content zones 704, overlay 706, and second spot 708, there need not be a direct connection. For example, in certain implementations, the media stream server 714 may interact with the CMS server 700 to provide or control the media stream content 712. The CMS server 700 would then pass along or otherwise enable the role of the media stream server 714.

FIG. 8 illustrates a method 800 for playing both media stream content and spots on digital signage. The method begins at step 802, which comprises playing media from a stream. As described above, playing media from a stream may include receiving the media from the media stream server 714 and transmitting, receiving, or otherwise causing the streaming media to playback on the digital signage.

In certain implementations, the media may be played as shown in the third spot 710. The media stream 712 may be played in a portion of the screen while an overlay 706 is concurrently played in another portion of the screen. In other implementations, the media stream 712 may occupy the entire screen.

Next, the flow moves to step 804, which comprises detecting a first trigger. The trigger may be an indication of a change of state in the media stream. For example, the first trigger may indicate that an advertisement will be played over the media stream. The trigger itself may be received in a variety of ways. For example, the media stream itself may include an indication that is interpreted as a trigger. As another example, the media stream server 714 may transmit a signal independent of the media stream. As yet another example, the trigger may be the result of a time analysis. For instance, a device (such as the CMS server 700 or digital signage) may include a schedule that includes trigger events keyed to certain times. Once the device detects that the current time is substantially the same as one of the keyed certain times, the digital signage may cause the trigger to be received. As another example, the trigger may be caused by a detected change in state of the media stream. For instance, the device may monitor the content of the media stream for changes in state. While monitoring the video, audio, or other content of the media stream, the device may compare the detected content with a database of known triggers (e.g., the detected content may hash to or otherwise correspond with a known trigger pattern). When the device detects that the content corresponds with the trigger, the device may cause the trigger to be received.

In certain implementations, the trigger may indicate a change in the stream's status or content. For example, the trigger may indicate that the stream is: terminating, beginning, switching to an advertisement, returning from playing advertising, switching to breaking news, switching channels, switching programming (e.g., changing from one broadcast television show to another), switching programming types, encountering an error, and other triggers relating to the stream. In certain other implementations, the trigger may indicate a change in spots. For example, the trigger may be an indication that a playlist of spots, a spot, and/or the digital signage: has completed playback, has no available spots to play, is unable to connect to a server, is unable to playback content, has encountered an error, or other triggers relating to a change in status. In certain other implementations, the trigger may indicate a change in time, such as the expiration of a timer, the current time being a particular time, or other changes of time.

Next, the flow moves to step 806, which comprises playing a spot, for example playing a spot responsive to detecting the first trigger. The digital signage may play the spot in a manner described within this disclosure, for example, as shown or described in FIG. 2. In certain implementations, the spot may be continuously played in the background or in a manner such that it is not visible when the media stream is playing. In such implementations, playing a spot may comprise making the spot visible and the media stream invisible. For example, the media stream may be played on a first layer and the spot may be played on a second layer. While the media from a stream is being played, the first layer may played above the second layer or otherwise in such a manner that the content of the first layer is substantially more visible than the content of the second layer. When the spot is played, the layers may switch position such that the second layer is visible.

In certain implementations, the spot may be played such that the media stream is not interrupted. In such implementations, the uninterrupted nature of the media stream may allow, for example, the CMS server 700 and/or the digital signage to monitor for and/or receive triggers even while the spot is playing.

In certain implementations, the spot may played as shown in FIG. 7 as the first spot 702 or the second spot 708. For example, if the spot is being played like the first spot 702, there may be an overlay 706. The overlay 706 may be a same overlay 706 that was played during the playback of the media stream 712. The overlay 706 may also be a different overlay. As another example, if the spot is being played like the second spot 708, there may not be an overlay and the spot 708 would be played as occupying the full screen.

The flow then moves to the step 808, which may comprise detecting a second trigger. Detecting a second trigger may be the same or similar as detecting the first trigger in step 804. The second trigger may be the same as or different from the first trigger.

The flow then moves to step 810, which may comprise returning to playing media from the stream, for example playing media from the stream responsive to determining the occurrence of the second trigger. This step may be the same or similar as playing media from the stream in step 802.

FIG. 9 illustrates a representation of the method shown and described in FIG. 8. Specifically, a time line indicates the passing of time (from left to right). At a first time, the media stream 712 is played with an overlay 706. The media stream 712 is played on Z Layer 1 and the overlay 706 is played on Z Layer 3. Both Z Layer 1 and Z Layer 3 are visible. At this time, the second spot 708 may be playing on Z Layer 2. This layer may be hidden behind Z Layer 1, not be playing at all, or is otherwise not visible. At a second time, a first trigger is detected (e.g., received from the media stream 712). After receipt of the first trigger, the second spot 708 is activated or otherwise made visible. As shown below the time line, Z Layer 2 is visible and Z Layer 1 is hidden from view. In certain implementations, Z Layer 3 may be visible with Z Layer 2 during this time. At a third time, a second trigger is received (e.g., from the media stream 712). After receipt of the second trigger, the media stream 712 is made visible again. As is shown below the time line, Z Layer 1 and Z Layer 3 are visible.

The methods disclosed may be implemented as sets of instructions or software readable by a device. The specific order or hierarchy of steps in the disclosed methods are examples of sample approaches, and the specific order or hierarchy of steps in the method can be rearranged while remaining within the disclosed subject matter. The accompanying system, method and computer-readable media claims present elements of the various steps in a sample order, and are not necessarily meant to be limited to the specific order or hierarchy presented.

The present disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and its advantages will be understood by the foregoing description, and it will be apparent that changes may be made in the form, construction and arrangement of the components without departing from the disclosed subject matter. The form described is merely explanatory, and it is the intention of the following claims to encompass and include such changes.

While the present disclosure has been described with reference to various embodiments, it will be understood that these embodiments are illustrative and that the scope of the disclosure is not limited to them. These and other variations, modifications, additions, and improvements may fall within the scope of the disclosure as defined in the claims that follow.

What is claimed is:

1. A digital signage system, comprising:
a processor and memory;
a media player for delivering content to digital signage, the media player configured to receive at least one playlist having media slots and media spots,
wherein the media player is configured to cause the at least one playlist having the media slots to play the media spots, wherein at least one of the media spots is a content controlling spot that includes intelligent content for commanding control of delivery of other media spots by causing the content controlling spot to, upon being instigated:
search for media spots remotely located from the playlist to be played by the media player;
identify at least one remotely located media spot from a plurality of media spots to be played; and
cause the at least one of the identified remotely located media spots of the plurality of the media spots to be retrieved,
and
wherein the media player plays the at least one retrieved media spot on the digital signage.

2. The system of claim 1, wherein the at least one remotely located media spot is stored remotely from the media player.

3. The system of claim 1, wherein the step of causing the at least one of the identified remotely located media spots of the plurality of the media spots to be retrieved comprises determining whether the at least one remotely located media spot can be played without local caching or requires local caching, and wherein based on the determination, the media player either plays the at least one retrieved media spot on the digital signage without locally caching the retrieved media spot or plays the media spot that has been locally cached.

4. The system of claim 3, wherein when the content controlling spot determines the at least one remotely located media spot requires local caching, the content controlling spot causes default content to be played by the media player during local caching.

5. The system of claim 1, wherein the intelligent content is further configured to cause the content controlling spot to, upon being instigated, determine if the content controlling spot is linked to a locally stored media spot, and if the content controlling spot is linked to the locally stored media spot, the content controlling spot causes the locally stored media spot to be played by the media player on the digital signage.

6. The system of claim 5, wherein the content controlling spot determines if a play pool linked to the content controlling spot includes the locally stored media spot.

7. The system of claim 5, wherein prior to the media player finishing playing the locally stored media spot, the content controlling spot initiates a retrieval process of an additional media spot.

8. The system of claim 7, wherein the retrieval process of the additional media spot comprises causing the content controlling spot to execute the search for media spots remotely located from the playlist to be played by the media player.

9. The system of claim 5, wherein if the content controlling spot determines that it is not linked to a locally stored media spot, the content controlling spot is caused to execute the search for media spots remotely located from the playlist to be played by the media player.

10. The system of claim 1, wherein the digital signage system is configured as one of an electronic billboard, a digital signage kiosk, or a mounted screen.

11. The system of claim 1, wherein the at least one remotely located media spot comprises content including at least one of travel status information, advertising, wait time status information, menu information, daily specials information, call center information, or patient information.

12. A computer system for delivering content to digital signage, comprising:
a processor and memory storing a media player, at least one playlist having media slots and media spots, wherein the media player is configured to cause the at least one playlist having the media slots to play the stored media spots, wherein at least one of the stored media spots is a content controlling spot that includes intelligent content for commanding control of delivery of other media spots by causing the content controlling spot to, upon being instigated:
search for media spots remotely located from the playlist to be played by the media player;
identify at least one remotely located media spot from a plurality of media spots to be played; and
cause the at least one of the identified remotely located media spots of the plurality of the media spots to be retrieved,
and
wherein the media player causes the at least one retrieved media spot to be played on digital signage.

13. The computer system of claim 12, wherein the at least one remotely located media spot is stored remotely from the media player.

14. The computer system of claim 12, wherein the step of causing the at least one of the identified remotely located media spots of the plurality of the media spots to be retrieved comprises determining whether the at least one remotely located media spot can be played without local caching or requires local caching, and wherein based on the determination, the media player either plays the at least one retrieved media spot on the digital signage without locally caching the retrieved media spot or plays the media spot that has been locally cached.

15. The computer system of claim 14, wherein when the content controlling spot determines the at least one remotely located media spot requires local caching, the content controlling spot causes default content to be played by the media player during local caching.

16. The computer system of claim 12, wherein the intelligent content is further configured to cause the content controlling spot to, upon being instigated, determine if the content controlling spot is linked to a locally stored media spot, and if the content controlling spot is linked to the locally stored media spot, the content controlling spot causes the locally stored media spot to be played by the media player.

17. The computer system of claim 16, wherein prior to the media player finishing playing of the locally stored media spot, the content controlling spot initiates a retrieval process of an additional media spot.

18. The computer system of claim 17, wherein the retrieval process of the additional media spot comprises causing the content controlling spot to execute the search for media spots remotely located from the playlist to be played by the media player.

19. The computer system of claim 16, wherein if the content controlling spot determines that it does not link to a locally stored media spot, the content controlling spot is caused to execute the search for media spots remotely located from the playlist to be played by the media player.

20. The computer system of claim 12, wherein the digital signage comprises a display and houses the processor and memory.

* * * * *